United States Patent [19]

Okura et al.

[11] Patent Number: 5,002,370
[45] Date of Patent: Mar. 26, 1991

[54] REFLECTION LIGHT PREVENTIVE DEVICE MAKING USE OF FARADAY EFFECT

[75] Inventors: Masahiko Okura, 11-7, 4-chome, Shiroganedai, Minatoku, Tokyo; Noritaka Ishiyama, Tokyo, both of Japan

[73] Assignee: Masahiko Okura, Tokyo, Japan

[21] Appl. No.: 550,038

[22] Filed: Jul. 9, 1990

[51] Int. Cl.⁵ ............................................... G02F 1/09
[52] U.S. Cl. ................................................. 350/375
[58] Field of Search ............... 350/400, 375, 377, 403, 350/401, 196.13, 96 H, 96.18

[56] References Cited

U.S. PATENT DOCUMENTS

| 4,375,910 | 3/1983 | Seki ........................................ | 350/375 |
| 4,756,607 | 7/1988 | Watanabe et al. .................. | 350/375 |

*Primary Examiner*—Mark Hellner
*Attorney, Agent, or Firm*—Moonray Kojima

[57] ABSTRACT

There is disclosed a reflection light preventive device comprising a cylinder-like transparent glass body being included many granulated permanent magnets therein to be possessed of the Faraday effect and a λ/4 polarizer disposed at the front and rear of said glass body respectively in a shifted relation each other in their planes of polarization.

3 Claims, 1 Drawing Sheet

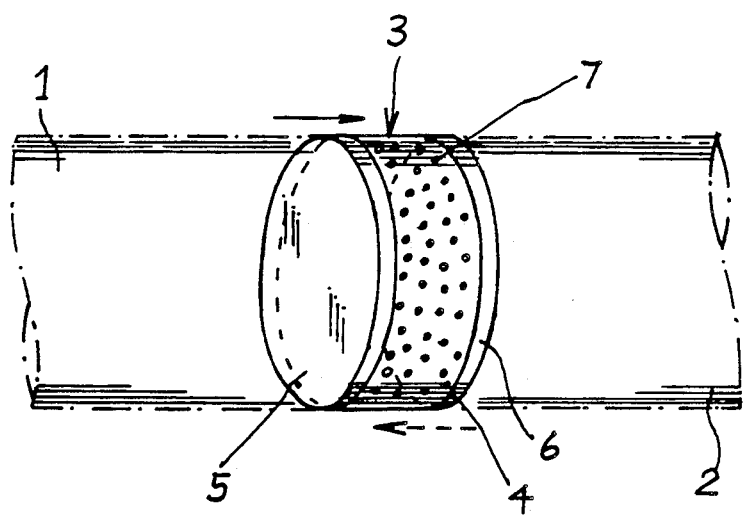

REFLECTION LIGHT PREVENTIVE DEVICE MAKING USE OF FARADAY EFFECT

BACKGROUND OF THE INVENTION

As a similar device of this invention, the polarizer for the micro wave having long wave length are well known, wherein a magnetic field generating coil, a ferrite and resistance plates are involved. However such an optical device as disclosed herein has never been presented.

SUMMARY OF THE INVENTION

This invention has been primarily directed to yield a large effect when used for laser or optical fiber lines. Fundamentally stated, the object of this invention consists in preventing a harmful reflection light coming into the optical fiber line or laser course from the opposite direction thereof. Such a device relating to this invention has heretofore never disclosed as stated above.

In the usual micro wave polarizer making use of Faraday effect, it is inevitable to have a large size body because of the large magnetic field and the great power, while in the optical device as stated in this invention, the effective prevention of the reflection light must be realized under such a conception that there needs a small size body for a large magnetic field generated without power The reason for the need of the small size body is that, in this event, the large size body would arise a decrement of light therethrough.

To be concreted, such the requisite condition of this invention will be accomplished by a small size transparent glass body including elements therein as stated in the following preferred embodiment and suitable optical polarizers arranged at the front and rear of the class body.

BRIEF DESCRIPTION OF THE DRAWING

The Figure is a schematic perspective view of one form of the invention.

DETAILED DESCRIPTION OF THE PREFERRED EMBODIMENT

In the FIG., 1 and 2 are optical fiber cables. 3 is a reflection light preventing device of this invention arranged between said fiber cables, which is composed of a transparent glass body 4 and $\lambda/4$ polarizers 5, 6 arranged perpendicularly to the incident ray axis at the front and rear of the body 4 in shifted relation by 45° each other in the planes of polarization thereof. The body 4 is a cylinder shaped transparent glass block, into which many granulated permanent magnets 7 are dispersed to be possessed of the 45° rotating effect. The well known artificial optical polarizers may be used for the elements 5, 6 in this event.

As the device 3 is arranged between the optical fiber cables 1 and 2, it will be apparent that, the ray entering into the device from the direction indicated by the solid line arrow (see Figure) may pass through the two polarizers 5, 6 without any impediments due to 45° rotating effect which causes to bring the plane of the front polarizer in line with the same of the rear polarizer, while the reflecting light entering into from opposite direction as shown by the dotted line arrow will arise decrement to disappear owing to difference of 90° between plannes of polarizers 5 and 6.

The above noted transparent glass body 4 and the granulated permanent magnets 7 are desirous in this event to be selected from such things as stated in the following items, namely (a) the body 4 is composed of $ROx$ of 1% to 50% and the remaining part comprises $Na_2O_3$ and $SiO_2$, wherein the "R" is a character denoting one or a combination of above two of among Ce, La, Pr, Nd, Sm, Eu, Gd, Tb, Dy, Ho and the "x" denotes 1 or 2. For example, it is a mixture of $Na_2O_3 + SiO_2$ and $CeO_2$; (b) the main component of the granulated permanent magnets 7 in the glass body 4 is denoted in "RT" wherein "R" is the same as aforesaid one, while the "T" denotes Co or Fe or a mixture of Co and Fe. For example, it is composed of La, Fe; (c) the size of the magnets may be $0.5\mu/m$ to $20\mu/m$ or so.

As understood from the aforesaid explanation, according to the invention, since the device can be operated by the magnetic force without need of power and yet since the glass body is composed of a particular unit including many granulated permanent magnets therein to obviate the necessity of large size one, it possesses the great advantage that it can be made into small size and manufactured at low cost, to say nothing of the high preventive effect to the reflection light.

It must be noted that the diameter of the invented device may be larger than the same of the fiber cable as occasion calls, notwithstanding the both are depicted equally in the drawing.

What is claimed is:

1. A reflection light preventive device making use of the Faraday effect, characterized by comprising a cylinder-like transparent glass body having many granulated permanent magnets dispersed therein in order to induce the Faraday effect, and $\mu/4$ polarizers disposed perpendicular to the course of the ray incident thereupon at the front and rear of the glass body respectively.

2. A reflection light preventive device according to claim 1, wherein said cylinder-like transparent glass body has a 45° rotating effect.

3. A reflection light preventive device according to claim 2, wherein said polarizers are arranged in shifted relation by 45° in their planes of polarization.

* * * * *